Patented June 23, 1936

2,045,069

UNITED STATES PATENT OFFICE 2,045,069

MANUFACTURE OF WATER-INSOLUBLE INDULINES

Achille Conzetti, Basel, Switzerland, assignor to firm of J. R. Geigy A. G., Basel, Switzerland No Drawing. Application November 20, 1935, Serial No. 50,787. In Germany March 29, 1934

8 Claims. (Cl. 260—29)

This invention is an improvement in or a modification of that described in the specification of my U. S. patent application, Serial No. 48,261, filed November 4, 1935.

In that specification is described a manufacture of new azine-dyestuffs of the induline and nigrosine types which are insoluble in water, wherein there is substituted for aniline in the usual nigrosine and induline "melts" a suitable derivative or a substitution product thereof. Particularly suitable compounds for the purpose are alkoxy substituted amines of the mono- and di-phenylamine series. The new dyestuffs thus obtained have an enhanced solubility in lower alcohols, esters and solvent mixtures such as are customary in the production of nitrocellulose and acetylcellulose lacquers; they also have better properties of fastness.

According to the present invention the solubility in lower alcohols of the known blue to black azine-dyestuffs of the induline class can be improved by heating the dyestuff at a high temperature with an alkoxy substitution product of an amine of the benzene series. The solubility of the new dyestuff in lower alcohols may amount to a multiple of that of the induline used as the parent dyestuff.

The following examples illustrate the invention:—

Example 1

50 kilos of nigrosine, spirit soluble (Schultz, Farbstofftabellen, 7th edition, No. 985) and 180 kilos of 4-amino-phenol-ethylether are heated together for 17 hours at 210–215° C. in a reflux apparatus. The finished melt is then poured into a mixture of 500 litres of water and 100 kilos of concentrated hydrochloric acid, the whole is filtered and the dyestuff is freed from excess of base by washing with slightly acidified water.

When dry the dyestuff is a blue-black powder which is soluble without residue in lower alcohols up to a concentration of 10 per cent.

Example 2

30 kilos of induline, spirit soluble (Schultz, Farbstofftabellen, 7th edition, No. 982) and 100 kilos of 4-amino-phenol-ethylether are heated together at 145° C. for about 15 hours. The finished melt is then poured into a mixture of 300 litres of water and 100 kilos of concentrated hydrochloric acid, the whole is filtered and freed from excess of base by washing and dried.

The dyestuff is a dark blue powder which is much more freely soluble in ethanol than is the parent dyestuff.

In the above examples, the 4-amino-phenol-ethylether can be replaced by the corresponding quantities of 2- or 3-amino-phenol-methyl- or ethylether, or the 4-amino-phenol-methylether.

What I claim is:—

1. A process for the manufacture of water-insoluble indulines, consisting in heating a water-insoluble blue to black dyestuff of the induline class with an aminophenolether of the benzene series of the following formula:

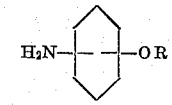

wherein R is a member of the group consisting of methyl and ethyl radicals.

2. A process for the manufacture of water-insoluble indulines, consisting in heating a water-insoluble blue to black dyestuff of the induline class with an aminophenolether of the benzene series of the following formula:

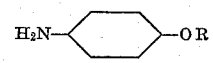

wherein R is a member of the group consisting of methyl and ethyl radicals, the two substituents NH₂ and OR being in p-position.

3. A process for the manufacture of water-insoluble indulines, consisting in heating a water-insoluble blue to black dyestuff of the induline class with an aminophenolether of the benzene series of the following formula:

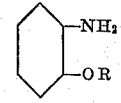

wherein R is a member of the group consisting of methyl and ethyl radicals, the two substituents NH₂ and OR being in o-position.

4. A process for the manufacture of water-insoluble indulines, consisting in heating a water-insoluble blue to black dyestuff of the induline class with 4-amino-phenol-ethylether.

5. A process for the manufacture of water-insoluble indulines, consisting in heating a water-insoluble blue to black dyestuff of the induline class with 4-amino-phenol-methylether.

6. A process for the manufacture of water-insoluble indulines, consisting in heating a water-insoluble blue to black dyestuff of the induline class with 2-amino-phenol-ethylether.

7. Water-insoluble indulines obtainable as condensation products by heating water-insoluble blue to black dyestuffs of the induline class with aminophenol ethers of the benzene series of the formula

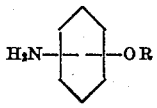

wherein R is a member of the group consisting of methyl and ethyl radicals, and having increased solubility in lower alcohols.

8. Water-insoluble indulines obtainable as condensation products by heating water-insoluble blue to black dyestuffs of the induline class with 4-amino-phenol-ethylether, and having increased solubility in lower alcohols.

ACHILLE CONZETTI.